US008962722B2

(12) United States Patent
Fontenot, III et al.

(10) Patent No.: US 8,962,722 B2
(45) Date of Patent: Feb. 24, 2015

(54) SOLVENT-LESS LIQUID ETHYLENE PROPYLENE DIENE MONOMER RUBBER COMPOUND AND METHOD OF MAKING

(75) Inventors: Arthur Joseph Fontenot, III, Baton Rouge, LA (US); Wasif Khan, Baton Rouge, LA (US); John Wesley Summers, II, Perry, OH (US)

(73) Assignee: Lion Copolymer Geismar, LLC, Geismar, LA (US)

( * ) Notice: Subject to any disclaimer, the term of this patent is extended or adjusted under 35 U.S.C. 154(b) by 335 days.

(21) Appl. No.: 13/525,192

(22) Filed: Jun. 15, 2012

(65) Prior Publication Data

US 2012/0319331 A1    Dec. 20, 2012

Related U.S. Application Data

(60) Provisional application No. 61/497,308, filed on Jun. 15, 2011.

(51) Int. Cl.
*C08K 5/15* (2006.01)
*C08L 23/16* (2006.01)
*C09D 123/16* (2006.01)
*C08K 5/1515* (2006.01)
*C08K 3/20* (2006.01)

(52) U.S. Cl.
CPC .............. *C08L 23/16* (2013.01); *C09D 123/16* (2013.01); *C08K 5/1515* (2013.01); C08L 2205/02 (2013.01); C08K 3/20 (2013.01)
USPC ........... 524/114; 524/311; 524/312; 524/261; 524/526

(58) Field of Classification Search
CPC ....... C08L 23/16; C08L 2205/02; C08K 3/20; C08K 5/1515; C09D 123/16
USPC .......................... 524/526, 114, 311, 312, 261
See application file for complete search history.

(56) References Cited

U.S. PATENT DOCUMENTS

| 2,384,543 | A | 9/1945 | Fryling |
| 4,076,769 | A | 2/1978 | Watts |
| 4,104,323 | A | 8/1978 | Hansen |
| 4,213,888 | A | 7/1980 | Karg et al. |
| 5,093,407 | A | 3/1992 | Komai et al. |
| 5,304,591 | A | 4/1994 | Nowakowsky et al. |
| 5,504,168 | A | 4/1996 | Maestri et al. |
| 5,763,388 | A | 6/1998 | Lightsey et al. |
| 5,985,953 | A | 11/1999 | Lightsey et al. |
| 6,197,384 | B1 | 3/2001 | Schubert et al. |
| 6,346,579 | B1 | 2/2002 | Zanzig et al. |
| 6,403,693 | B2 | 6/2002 | Materne et al. |
| 6,579,929 | B1 | 6/2003 | Cole et al. |
| 6,635,700 | B2 | 10/2003 | Cruse et al. |
| 6,921,785 | B2 | 7/2005 | Campbell et al. |
| 7,335,807 | B2 | 2/2008 | Hochgesang |
| 7,585,914 | B2 | 9/2009 | Tsou et al. |
| 2004/0071626 | A1 | 4/2004 | Smith et al. |
| 2005/0256267 | A1 | 11/2005 | Hochgesang |
| 2006/0100320 | A1 | 5/2006 | Dalphond et al. |
| 2007/0106024 | A1 | 5/2007 | Tsou et al. |
| 2007/0260005 | A1 | 11/2007 | Karato et al. |
| 2008/0221274 | A1 | 9/2008 | Jourdain |
| 2008/0293889 | A1 | 11/2008 | Obrecht |
| 2009/0124730 | A1 | 5/2009 | Matsuda et al. |
| 2009/0137716 | A1 | 5/2009 | Furukawa et al. |
| 2010/0022684 | A1 | 1/2010 | Wallen et al. |
| 2011/0165356 | A1 | 7/2011 | Harris et al. |
| 2011/0166262 | A1 | 7/2011 | Harris et al. |
| 2011/0166263 | A1 | 7/2011 | Rikhoff et al. |
| 2011/0166265 | A1 | 7/2011 | Harris et al. |

FOREIGN PATENT DOCUMENTS

| CA | 1242832 | 10/1988 |
| CA | 2724798 | 1/2010 |
| JP | 2005-33019 | 12/2005 |

*Primary Examiner* — Peter D Mulcahy

(74) *Attorney, Agent, or Firm* — Buskop Law Group, PC; Wendy Buskop

(57) ABSTRACT

A solvent-less liquid ethylene propylene diene rubber compound and a solvent-less liquid ethylene propylene rubber compound are provided. The compounds can include a liquid ethylene propylene diene or a liquid ethylene propylene mixed with a filler system, a plasticizer, and a cross-linking agent to form the compound. The compound can have a viscosity ranging from 150,000 centipoises to 750,000 centipoises at a temperature of 23 degrees Celsius, allowing the compound to be liquid injection moldable. The compound can contain substantially no solvent.

10 Claims, No Drawings

SOLVENT-LESS LIQUID ETHYLENE PROPYLENE DIENE MONOMER RUBBER COMPOUND AND METHOD OF MAKING

CROSS REFERENCE RELATED APPLICATIONS

The current application claims priority and the benefit of U.S. Provisional Patent Application Ser. No. 61/497,308 filed on Jun. 15, 2011, entitled "SOLVENT-LESS LIQUID ETHYLENE PROPYLENE DIENE MONOMER RUBBER COMPOUND AND METHOD OF MAKING." This reference is incorporated herein in its entirety.

FIELD

The present embodiments generally relate to a solvent-less liquid rubber compound of ethylene propylene diene or ethylene propylene, and methods of making the same.

BACKGROUND

A need exists for a solvent-less liquid rubber compound of ethylene propylene diene or ethylene propylene that is liquid injection moldable.

A need exists for a solvent-less liquid rubber compound for use in fuel cells, home generators, and other applications.

A need exists for a solvent-less liquid rubber compound that can be connected, molded, or sealed to both sides of fuel cell membranes, similar to a gasket, to form a hydrogen permeable layer that is not permeable to oxidants or fuel.

A need exists for methods for making a solvent-less liquid rubber compound of ethylene propylene diene or ethylene propylene that is liquid injection moldable.

A need exists for methods for making a solvent-less liquid rubber compound that can resist ozone degradation.

The present embodiments meet these needs.

BRIEF DESCRIPTION OF THE DRAWINGS

N/A

DETAILED DESCRIPTION OF THE EMBODIMENTS

Before explaining the present compound and method in detail, it is to be understood that the compound and method are not limited to the particular embodiments and that the embodiments can be practiced or carried out in various ways.

The present embodiments relate to a solvent-less liquid ethylene propylene diene rubber compound and a solvent-less liquid ethylene propylene rubber compound, also referred to as a solvent-less liquid rubber compound.

The solvent-less liquid rubber compound can be used to make sealing members, such as by curing the solvent-less liquid rubber compound.

Ethylene propylene diene rubber, a terpolymer, is a type of synthetic rubber and is an elastomer. The ethylene propylene diene rubber can be an M-class rubber, as classified under American Society for Testing and Materials (ASTM) standard D-1418. M-class rubbers have a saturated chain of the polymethylene type.

The ethylene propylene diene rubber can have one of the following molecular formulas: $(C_2H_4)_x$—$(C_3H_6)_y$—$(C_9H_{12})_z$ or $(C_2H_4)_x$—$(C_3H_6)_y$—$(C_{10}H_{12})_n$.

The ethylene propylene rubber, a copolymer, can have the following molecular formula: $(C_2H_4)_x$—$(C_3H_6)_y$.

The ethylene content of the ethylene propylene diene rubber and the ethylene propylene rubber can range from about 39 weight percent to about 75 weight percent.

The propylene content of the ethylene propylene diene rubber and the ethylene propylene rubber can range from about 24 weight percent to about 60 weight percent.

The dienes content of the ethylene propylene diene rubber can range from about 0.01 weight percent to about 12 weight percent. The dienes can function as cross-links when the solvent-less liquid ethylene propylene diene rubber compound is cured. The dienes used in the manufacture of the ethylene propylene diene rubber can include dicyclopentadiene, ethylidene norbornene, and vinyl norbornene.

The solvent-less liquid rubber compound can be liquid injection moldable, allowing the solvent-less liquid ethylene propylene diene rubber compound to be used in liquid injection molding to form various formed parts.

The solvent-less liquid rubber compound can include from 20 weight percent to 60 weight percent of a liquid ethylene propylene diene rubber or from 20 weight percent to 60 weight percent of a liquid ethylene propylene rubber. One or more embodiments can include 41 weight percent of the liquid ethylene propylene diene rubber or 41 weight percent of the liquid ethylene propylene rubber.

The liquid ethylene propylene diene rubber can be a terpolymer with a backbone made of: ethylene monomer, propylene monomer, and diene monomer. The liquid ethylene propylene rubber can be a copolymer with a backbone made of: ethylene monomer and propylene monomer.

The liquid ethylene propylene diene rubber and liquid ethylene propylene rubber can each have the following physical/chemical properties: a viscosity ranging from about 100 centipoises to about 200,000 centipoises, a high extendibility allowing for high levels of fillers and plasticizers to be added, and an ability to have functional groups, such as maleic anhydride, grafted to the backbone of the terpolymer or copolymer.

The polymer molecules of the liquid ethylene propylene diene rubber and the liquid ethylene propylene rubber can be combined with a solution of from about 0.5 weight percent to about 15 weight percent of a solid ethylene propylene diene or a solid ethylene propylene dissolved in a plasticizing oil. The solid ethylene propylene diene or solid ethylene propylene can enhance the tensile and elongation properties of the solvent-less liquid rubber compound.

The plasticizing oil can be paraffinic oil, naphthenic oil, or ester oil. The amount of plasticizing oil in the compound can range from about 5 weight percent to about 30 weight percent. The plasticizing oil can function to lower the viscosity of the solvent-less liquid rubber compound to facilitate in ease of processing, and to act as a carrier to introduce the solid ethylene propylene diene or solid ethylene propylene.

The solvent-less liquid rubber compound can include from 5 weight percent to 30 weight percent of a filler system, which can be mixed with the liquid ethylene propylene diene rubber or the liquid ethylene propylene rubber. One or more embodiments can include 20 weight percent of the filler system.

The filler system can be zinc oxide, calcium carbonate, calcium oxide, aluminum silicate, kaolin clay, titanium dioxide, magnesium silicate, talc, precipitated silica, hydrated amorphous silica, fumed silica, silica, carbon black, or combinations thereof.

The silica can be pretreated with a coupling agent. The coupling agent can be mercaptans silane, silanol, silane, polysulfidic silane, polysulfidic silane, or combinations thereof.

The plasticizer can function to dissolve the liquid ethylene propylene diene rubber compound or the liquid ethylene propylene rubber compound making the liquid ethylene propylene diene rubber compound or the liquid ethylene propylene rubber compound more fluid; thereby forming a paste-like solvent-less liquid rubber compound.

The solvent-less liquid rubber compound can have a viscosity ranging from about 150,000 centipoises to about 750,000 centipoises at a temperature of about 23 degrees Celsius. One or more embodiments of the solvent-less liquid rubber compound can be readily flowable at a temperature ranging from about degrees Celsius to about 150 degrees Celsius.

The solvent-less liquid rubber compound can contain substantially no solvent, which can be beneficial because it can avoid environmental, safety, and handling issues associated with solvents.

The solvent-less liquid rubber compound can be moldable to form various parts, such as thin-walled hydrogen permeable layers or other items of manufacture. The thin-walled hydrogen permeable layers can be impermeable to oxidants.

Other examples of parts or items of manufacture that can be made of the solvent-less liquid rubber compound can include: gaskets, o-rings, molded button covers, shock dampening parts, and molded parts exposed to ozone.

One or more embodiments of the solvent-less liquid rubber compound can include from about 0.1 weight percent to about 20 weight percent of a cross-linking agent to provide strength in vulcanization of the solvent-less liquid rubber compound.

The cross-linking agent can include a phenolic resin. The cross-linking agent can also include an organic peroxide, such as t-butyl perbenzoate or peroxy ketal. The cross-linking agent can also include a silanol. The cross-linking agent can be a combination of organic peroxide and silanol.

One or more embodiments of the solvent-less liquid rubber compound can include an additional ethylene propylene diene rubber or an additional ethylene propylene rubber in an amount ranging from about 1 weight percent to about 15 weight percent. The additional ethylene propylene diene rubber and the additional ethylene propylene rubber can be produced from a member selected from the group consisting of: ethylene propylene ethylidene norbornene, ethylene propylene dicyclopentadiene, ethylene butene ethylidene norbornene, ethylene propylene vinylidene norbornene, ethylene butene dicylcopentadiene, and combinations thereof.

One or more embodiments of the solvent-less liquid rubber compound can include from about 0.1 weight percent to about 15 weight percent of a lubricant. The lubricant can be a polyethylene homopolymer or another lubricant, and can provide release after liquid injection molding.

One or more embodiments relate to a method for making a finished part from the solvent-less liquid rubber compound.

The method can include mixing from 20 weight percent to 60 weight percent of the liquid ethylene propylene diene rubber or from 20 weight percent to 60 weight percent of the liquid ethylene propylene rubber with: from 1 weight percent to 15 weight percent of a solid ethylene propylene diene rubber dissolved in the plasticizing oil or from 1 weight percent to 15 weight percent of the solid ethylene propylene rubber dissolved in the plasticizing oil.

Also, from 5 weight percent to 30 weight percent of the filler system and from 5 weight percent to 30 weight percent of the plasticizer can be mixed in along with a cross-linking agent.

The mixing can be performed in a low shear mixer.

For example, the temperature can be at 212 degrees Fahrenheit when the liquid ethylene propylene diene rubber, filler system, and plasticizer are added into the low shear mixer.

The temperature can then be reduced down to 150 degrees Fahrenheit before adding the cross-linking agent into the low shear mixer. The mixing can be performed at ambient pressure or under vacuum.

The liquid ethylene propylene diene rubber or liquid ethylene propylene rubber, filler system, and plasticizer can be added into the reaction vessel or low shear mixer simultaneously, or in the following order. First, the liquid ethylene propylene diene rubber or liquid ethylene propylene rubber, the plasticizing oil with the dissolved solid ethylene propylene diene rubber or solid ethylene propylene rubber, and a lubricant can be added and mixed to form a uniform mixture. Then, the filler system, any pigments, or combinations thereof can be added into the low shear mixer and mixed to form a uniform mixture. Finally, the temperature can be reduced and the cross-linking agent can be added into the low shear mixer.

The mixing of the liquid ethylene propylene diene rubber or the liquid ethylene propylene rubber with the filler system and the plasticizer can form a uniform mixture that can have a viscosity ranging from about 150,000 centipoises to about 750,000 centipoises at a temperature of about 23 degrees Celsius.

The method can include using liquid injection molding equipment to make the finished part. The uniform mixture can be molded at a temperature ranging from about 120 degrees Celsius to about 200 degrees Celsius using the liquid injection molding equipment. During the molding, cross-linking of polymers within the uniform mixture can occur, thereby forming the finished part.

Examples of liquid injection molding equipment can include the Milacron Magna MT 90 manufactured by Milacron of Cincinnati, Ohio or the Desma 969.100 Z manufactured by Desma of Hebron, Ky.

The uniform mixture can cure within the liquid injection molding equipment for a time period ranging from about 20 seconds to about 60 seconds, and at an ambient pressure.

The method can include removing the finished part from the liquid injecting molding equipment. The finish part can have a tensile strength ranging from about 300 pounds per square inch to about 1100 pounds per square inch.

One or more embodiments of the method can include mixing from about 0.1 weight percent to about 20 weight percent of a first curative into the liquid ethylene propylene diene rubber or the liquid ethylene propylene rubber, the filler system, and the plasticizer. The first curative can be an organic peroxide, or any of the cross-linking agents discussed herein. The first curative can be added after the temperature in the low shear mixer is reduced.

One or more embodiments of the method can include mixing from about 0.1 weight percent to about 10 weight percent of a second curative into the liquid ethylene propylene diene rubber or the liquid ethylene propylene rubber, the filler system, and the plasticizer. The second curative can be trimethylolpropane trimethacrylate or any of the cross-linking agents discussed herein. The second curative can be added after the temperature in the low shear mixer is reduced along with the first curative.

One or more embodiments of the method can include mixing from about 0.1 weight percent to about 10 weight percent of the coupling agent into the liquid ethylene propylene diene rubber or the liquid ethylene propylene rubber, the filler system, and the plasticizer. The coupling agent can be vinyl tris (2-methoxy ethoxy) silane, mercaptains, silanol, another silane, or combinations thereof. The coupling agent can be added after the temperature in the low shear mixer is reduced along with the first curative and the second curative.

One or more embodiments of the method can include mixing from about 0.1 weight percent to about 15 weight percent of a lubricant into the liquid ethylene propylene diene rubber or liquid ethylene propylene rubber, the filler system, and the plasticizer. The lubricant can be a polyethylene homopolymer or another lubricant, and can provide release after liquid injection molding.

One or more embodiments of the method can include radiating the formed part for a time period long enough to cause cross-linking of the uniform mixture in the formed part.

EXAMPLE 1

Making A Solvent-Less Liquid Ethylene Propylene Rubber Compound and Molding the Compound Using Liquid Injection Molding From about 20 weight percent to about 60 weight percent of a liquid ethylene propylene rubber can be placed in a low shear mixer.

Up to 15 weight percent of a solid ethylene propylene dissolved in a plasticizing oil can be placed in the low shear mixture.

From about 0.1 weight percent to about 15 weight percent of a lubricant, such as a polyethylene homopolymer lubricant, can be added to the low shear mixer.

The liquid ethylene propylene rubber, solid ethylene propylene dissolved in the plasticizing oil, and lubricant can be mixed until uniform.

Then, from about 5 weight percent to about 30 weight percent of a filler system along with any pigments can be added into the low shear mixture and mixed until uniform.

During the addition and mixing of the liquid ethylene propylene rubber, solid ethylene propylene dissolved in the plasticizing oil, lubricant, filler system, and any pigments, the temperature can be maintained at about 212 degrees Fahrenheit.

The temperature can be reduced to about 150 degrees Fahrenheit, and then from 0.1 weight percent to 20 weight percent of a cross-linking agent can be added to the low shear mixture, and mixed to form a uniform mixture.

The uniform mixture can be molded at a temperature ranging from about 120 degrees Celsius to about 200 degrees Celsius using the liquid injection molding equipment. During the molding, cross-linking of polymers within the uniform mixture can occur, thereby forming the finished part.

The uniform mixture can cure within the liquid injection molding equipment for a time period ranging from about 20 seconds to about 60 seconds, forming a finished part or item.

The finished part or item can be removed from the liquid injecting molding equipment.

EXAMPLE 2

Making A Solvent-Less Liquid Ethylene Propylene Diene Rubber Compound and Molding the Compound Using Liquid Injection Molding The 20 weight percent to about 60 weight percent of liquid ethylene propylene rubber can be replaced with 20 weight percent to about 60 weight percent of a liquid ethylene propylene diene rubber, the solid ethylene propylene dissolved in the plasticizing oil can be replaced with solid ethylene propylene diene dissolved in the plasticizing oil, and the remaining steps described in Example 1 can be performed.

EXAMPLE 3

One or more embodiments can include 100.00 parts per hundred parts of resin (phr) of the ethylene propylene diene terpolymer, also called Trilene 65.

The compound can include 50.00 phr of a 5 percent solution of 535/PP N Oil™, a highly hydrotreated white oil.

The compound can include 50.00 phr of Hi-Sil 915™, a non-black silicon filler, available from PPG Industries of Pittsburgh, Pa.

The compound can include 10.00 phr of AC 617 A™, which is a Honeywell Specialty Additive of low-density polyethylene homopolymer in prill form for use in solvent-borne coatings to improve surface properties and appearance, and is available from Honeywell of Morristown, N.J.

The compound can include 10.00 phr of zinc oxide as a light stabilizer.

The compound can include 5.00 phr of Silquest A-172™ silane, also called vinyl tris(2-methoxyethoxy)silane, which is a vinyl-functional coupling agent that promotes adhesion among unsaturated, polyester-type resins, cross-linked polyethylene resins, or elastomers and inorganic substrates, including fiber glass, silica, silicates, and metal oxides. Silquest A-172™ silane is available from Crompton OSI Specialties of Middlebury, Conn.

The compound can include 10.00 phr of Luperox 231™, also called peroxyketal, which has about 92 weight percent of peroxide, or 3,3,5-trimmethylcyclohexylidene)bis[(1,1-dimethylethyl), as well as about 8 weight percent of cyclohexanone, or 3,3,5,-trimethyl-. The Luperox 231™ can function as an initiator or curative, and is available from Arkema Inc. of Philadelphia, Pa.

The compound can include 5.00 phr of terbutyl peroxy benzoate peroxide as a curative.

The compound can include 4.00 phr of Sartomer 350™ coagent, as a curative. Sartomer 350™ coagent is trimethylolpropane trimethacrylate, which is a low volatility trifunctional monomer that can provide a fast cure response in free radical polymerization, and is available from Sartomer USA, LLC of Exton, Pa.

As a test, the composition of Example 3 was allowed to cure and then measured using a rheometer at 200 degrees Celsius (ASTM Method D048). The composition of Example 3 was determined to have a minimum viscosity (ML) of 0.1 deciNewtons-meters (dN-m), a maximum torque (MH) of 25.3 dn-m, a a ts2 (scorch time for torque to rise 2 units above minimum torque) of 0.2 minutes, and a t'c90 (cure time to reach 90 percent of full cure) of 0.4 minutes.

As another test, the composition of Example 3 was allowed to cure for 5.5 minutes at 160 degrees Celsius, and found to have an indentation hardness of 66 Shore A unit, a 25 percent modulus of 1.0 MegaPascals (MPa), a tensile strength of 2.0 MPa, and an elongation of 57 percent.

EXAMPLE 4

One or more embodiments can include the same components in the same proportions as discussed above in Example 3, with the exception of replacing the 50.00 phr of the 5 percent solution of 535/PP N Oil™ with 50.00 phr of a 7.5 percent solution of 535/PP N Oil™.

As a test, the composition of Example 4 was allowed to cure, and then measured using a rheometer at 200 degrees Celsius (ASTM Method D048). The composition of Example 4 was determined to have a minimum viscosity (ML) of 0.2 deciNewtons-meters (dN-m), a maximum torque (MH) after cross-linking of 29.1 dn-m, a ts2 (scorch time for torque to rise 2 units above minimum torque) of 0.1 minutes, and a t'c90 (cure time to reach 90 percent of full cure) of 0.3 minutes.

As another test, the composition of Example 4 was allowed to cure for 5.5 minutes at 160 degrees Celsius, and found to have an indentation hardness of 69 Shore A, a 25 percent modulus of 1.1 MegaPascals (MPa), a 100 percent modulus of 4.0 MPa, a tensile strength of 4.5 MPa, and an elongation of 111 percent.

EXAMPLE 5

One or more embodiments can include the same components in the same proportions as discussed above in Example 3, with the exception of replacing the 50.00 phr of the 5 percent solution of 535/PP N Oil™ with 50.00 phr of a 10 percent solution of 535/PP N Oil™.

As a test, the composition of Example 5 was allowed to cure, and then measured using a rheometer at 200 degrees Celsius (ASTM Method D048). The composition of Example 5 was determined to have a minimum viscosity (ML) of 0.2 deciNewtons-meters (dN-m), a maximum torque (MH) after cross-linking of 29.0 dn-m, a ts2 (scorch time for torque to rise 2 units above minimum torque) of 0.2 minutes, and a t'c90 (cure time to reach 90 percent of full cure) of 0.3 minutes.

As another test, the composition of Example 5 was allowed to cure for 5.5 minutes at 160 degrees Celsius, and found to have an indentation hardness of 72 Shore A, a 25 percent modulus of 1.4 MegaPascals (MPa), a 100 percent modulus of 4.6 MPa, a tensile strength of 5.4 MPa, and an elongation of 112 percent.

EXAMPLE 6

One or more embodiments of the resin master batch can include the same components in the same proportions as discussed above in Example 3, with the exception of replacing the 50.00 phr of Hi-Sil 915™ with 50.00 phr of Austin 325 Black™, which is a ground coal product produced from bituminous coal, and is available from Coal Fillers Incorporated of Bluefield, Va.

In tests, the composition of Example 6 was found to not be fully cured after 1 minute at 160 degrees Celsius.

While these embodiments have been described with emphasis on the embodiments, it should be understood that within the scope of the appended claims, the embodiments might be practiced other than as specifically described herein.

What is claimed is:
1. A solvent-less liquid ethylene propylene diene rubber compound for use in liquid injection molding, the compound comprising:
   a. 20 weight percent to 60 weight percent based on the total weight percent of the final formulation, of a liquid ethylene propylene diene rubber consisting of a terpolymer of ethylene monomer, propylene monomer, and diene monomer;
   b. 1 weight percent to 15 weight percent based on the total weight percent of the final formulation, of a solid ethylene propylene diene dissolved in a plasticizing oil;
   c. 5 weight percent to 30 weight percent based on the total weight percent of the final formulation, of a plasticizer;
   d. 5 weight percent to 30 weight percent based on the total weight percent of the final formulation, of a filler system;
   e. 0.1 weight percent to 20 weight percent of a cross-linking agent, wherein the cross-linking agent comprises a silanol;
   f. 0.1 weight percent to 10 weight percent of a first curative comprising an organic peroxide;
   g. 0.1 weight percent to 10 weight percent of a second curative comprising trimethylolpropane trimethacrylate;
      forming the solvent-less liquid ethylene propylene diene rubber compound, wherein the solvent-less liquid ethylene propylene diene rubber compound has a viscosity ranging from 150,000 centipoises to 750,000 centipoises at a temperature of 23 degrees Celsius, wherein the solvent-less liquid ethylene propylene diene rubber compound contains substantially no solvent, and wherein the solvent-less liquid ethylene propylene diene rubber compound is liquid injection moldable, and the solvent-less liquid ethylene propylene diene rubber compound is a uniform mixture which cures for a time period ranging from 20 seconds to 60 seconds achieving 90 percent of full cure at 200 degrees Celsius.

2. The compound of claim 1, wherein the solvent-less liquid ethylene propylene diene rubber compound is moldable to form a hydrogen permeable layer, and wherein the hydrogen permeable layer is impermeable to oxidants.

3. The compound of claim 1, comprising 41 weight percent of the liquid ethylene propylene diene rubber.

4. The compound of claim 1, comprising 20 weight percent of the filler system.

5. The compound of claim 1, further comprising an additional ethylene propylene diene rubber in an amount ranging from 1 weight percent to 15 weight percent, wherein the additional ethylene propylene diene rubber is produced from a member selected from the group consisting of:
   a. ethylene propylene ethylidene norbornene;
   b. ethylene propylene dicyclopentadiene;
   c. ethylene propylene vinylidene norbornene; and
   d. combinations thereof.

6. The compound of claim 1, wherein the plasticizing oil is: a paraffinic oil, a naphthenic oil, or an ester oil.

7. The compound of claim 1, wherein the filler system is: zinc oxide, calcium carbonate, calcium oxide, aluminum silicate, kaolin clay, titanium dioxide, magnesium silicate, talc, precipitated silica, hydrated amorphous silica, fumed silica, a silica pretreated with a coupling agent, carbon black, or combinations thereof.

8. The compound of claim 7, wherein the coupling agent is a mercaptan, a silane, a silanol, a silane, a polysulfidic silane, or combinations thereof.

9. The compound of claim 1, wherein:
   a. an ethylene monomer content of the ethylene propylene diene rubber ranges from 39 weight percent to 75 weight percent;
   b. a propylene monomer content of the ethylene propylene diene rubber ranges from 24 weight percent to 60 weight percent; and
   c. a diene monomer content of the ethylene propylene diene rubber ranges from 0.01 weight percent to 12 weight percent.

10. The compound of claim 1, wherein the liquid ethylene propylene diene rubber has a viscosity ranging from 100 centipoises to 200,000 centipoises.

* * * * *